(12) United States Patent
Perugupalli et al.

(10) Patent No.: US 11,997,240 B1
(45) Date of Patent: May 28, 2024

(54) METHOD AND AN APPARATUS FOR INLINE IMAGE SCAN ENRICHMENT

(71) Applicant: Pramana Inc., Cambridge, MA (US)

(72) Inventors: Prasanth Perugupalli, Cary, NC (US); Jaya Jain, Bhopal (IN); Prateek Jain, Karnataka (IN); Durgaprasad Dodle, Telangana (IN); Tasin Ahmed, Scarborough (CA); Deepak Anand, Karnataka (IN); Raghubansh Bahadur Gupta, Bangalore (IN); Himansh Mulchandani, Karnataka (IN); Vaibhav Singh, Karnataka (IN); Asa Rubin, Silver Springs, MD (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/227,155

(22) Filed: Jul. 27, 2023

(51) Int. Cl.
*H04N 1/04* (2006.01)
*H04N 1/00* (2006.01)
(Continued)

(52) U.S. Cl.
CPC .......... *H04N 1/04* (2013.01); *H04N 1/00005* (2013.01); *H04N 1/00336* (2013.01);
(Continued)

(58) Field of Classification Search
CPC .......... A61B 5/4088; A61B 2562/0223; A61B 5/0042; A61B 5/7267; A61B 5/246; A61B 5/6803; A61B 2503/40; A61B 2560/0223; A61B 2576/026; A61B 5/055; A61B 5/162; A61B 5/7203; A61B 5/7257; A61B 5/7264; A61B 5/245; A61B 5/4064; A61B 5/38; A61B 5/7246; A61B 17/16; A61B 18/20; A61B 18/203; A61B 2017/00061; A61B 2017/00066; A61B 2017/00106; A61B 2017/00203; A61B 2018/00029; A61B 2018/00565; A61B 2018/00577; A61B 2018/00642; A61B 2018/0066; A61B 2018/00785; A61B 2018/00809; A61B 2018/2025; A61B 2018/20351; A61B 2018/20359; A61B 2034/104; A61B 2034/2048; A61B 2034/2055; A61B 2034/2065; A61B 2034/302;
(Continued)

(56) References Cited

U.S. PATENT DOCUMENTS

2012/0148103 A1* 6/2012 Hampel ................. G06T 7/254
382/103
2013/0086578 A1* 4/2013 Eilam ................. G06F 9/45558
718/1
(Continued)

FOREIGN PATENT DOCUMENTS

EP 4083650 A1 11/2022

*Primary Examiner* — Negussie Worku
(74) *Attorney, Agent, or Firm* — Caldwell Intellectual Property Law

(57) ABSTRACT

An apparatus and method for inline scanned image enrichment is provided. The apparatus includes a computing device configured to receive a plurality of subject data, generate a candidate set to model the scan focal points from, digitally capture the slide using the identified focal points through machine-learning processes, processing the captured image to optimize its viewability, and storing the captured image in an accessible repository.

18 Claims, 7 Drawing Sheets

(51) Int. Cl.
   *H04N 1/21*    (2006.01)
   *H04N 1/387*   (2006.01)
   *H04N 1/409*   (2006.01)

(52) U.S. Cl.
   CPC ......... *H04N 1/2166* (2013.01); *H04N 1/3876* (2013.01); *H04N 1/409* (2013.01); *H04N 1/00331* (2013.01)

(58) Field of Classification Search
   CPC ...... A61B 2090/306; A61B 2090/3614; A61B 2090/3735; A61B 2090/3916; A61B 2090/3937; A61B 2218/001; A61B 2218/002; A61B 2218/007; A61B 34/10; A61B 34/30; A61B 34/32; A61B 34/35; A61B 5/066; A61B 5/1072; A61B 5/1075; A61B 5/1079; A61B 5/163; A61B 5/165; A61B 5/445; A61B 5/4803; A61B 5/6898; A61B 5/7221; A61B 8/4483; A61B 90/50; A61B 5/0022; A61B 5/01; A61B 5/021; A61B 5/02405; A61B 5/0245; A61B 5/0816; A61B 5/14507; A61B 5/14546; A61B 5/14551; A61B 5/208; A61B 5/4836; A61B 5/4842; A61B 5/7275; A61B 5/7282; G06F 9/5011; G06F 18/2413; G06F 30/28; G06F 16/355; G06F 16/358; G06F 18/214; G06F 3/0219; G06F 3/0233; G06F 3/0237; G06F 3/0238; G06F 9/5027; G06F 9/5038; G06F 9/5044; G06F 16/43; G06F 16/532; G06F 16/953; G06F 18/2185; G06F 18/22; G06F 18/256; G06F 16/3329; G06F 16/438; G06F 16/48; G06F 16/90332; G06F 18/211; G06F 18/23; G06F 2113/08; G06F 2218/08; G06F 3/0481; G06F 3/0482; G06F 3/04842; G06F 3/167; G06F 40/40; G06F 16/287; G06F 16/3344; G06F 16/45; G06F 16/483; G06F 16/487; G06F 16/489; G06F 16/9535; G06F 16/954; G06F 16/955; G06F 16/9577; G06F 16/958; G06F 18/2431; G06F 2111/10; G06F 3/048; G06F 3/0484; G06F 3/0488; G06F 3/04886; G06F 3/14; G06F 3/16; G06F 3/165; G06F 30/20; G06F 30/27; G06F 30/30; G06F 40/18; G06F 40/247; G06F 9/50; G03F 7/705; G03F 7/70525; G03F 7/70625; G03F 7/7065; G03F 1/36; G03F 1/68; G03F 1/80; G03F 7/70491; G03F 7/70508; G03F 7/70516; G03F 7/70616; G06Q 10/04; G06Q 10/06; G06Q 10/067; G06Q 10/06375; G06Q 30/0269; G06Q 30/0201; G06Q 30/0277; G06Q 50/18; G06T 2207/20084; G06T 7/0012; G06T 17/00; G06T 2207/20081; G06T 7/60; G06T 2200/08; G06T 2210/56; G06T 2200/32; G06T 2207/10024; G06T 2207/10056; G06T 2207/10081; G06T 2207/10152; G06T 2207/20056; G06T 2207/20076; G06T 2207/30004; G06T 2207/30024; G06T 2207/30061; G06T 2207/30088; G06T 2207/30096; G06T 2207/30244; G06T 2207/30268; G06T 5/001; G06T 5/50; G06T 7/0004; G06T 7/0016; G06T 7/11; G06T 7/33; G06T 7/62; G06T 7/73; G06T 7/74; G06T 7/75; G06T 7/80; G06T 11/00; G06T 11/001; G06T 11/206; G06T 2207/30156; G06T 7/143; G06T 7/149; G02B 21/06; G02B 21/086; G02B 21/365; G02B 21/367; G02B 27/58; H04N 17/002; H04N 21/41265; H04N 21/42203; H04N 21/42204; H04N 21/42206; H04N 21/42224; H04N 21/4828; H04N 23/63; H04N 23/80; H04N 21/00; H04N 21/42222; H04N 21/47; H04N 5/445; H04N 1/04; H04N 1/00005; H04N 1/00336; H04N 1/2166; H04N 1/3876; H04N 1/409; H04N 1/00331
   USPC ........................................... 358/1.09
   See application file for complete search history.

(56) References Cited

U.S. PATENT DOCUMENTS

| | | | |
|---|---|---|---|
| 2020/0210764 A1* | 7/2020 | Hamedi | G06V 10/764 |
| 2020/0258216 A1 | 8/2020 | Sharma | |
| 2020/0321124 A1* | 10/2020 | Ford | G06N 20/20 |
| 2021/0264161 A1* | 8/2021 | Saraee | G06F 18/2413 |
| 2022/0270222 A1* | 8/2022 | Kashiwagi | G06T 5/50 |
| 2022/0335256 A1* | 10/2022 | Saraee | G06F 18/22 |
| 2023/0061831 A1* | 3/2023 | Nishizawa | G06T 7/593 |
| 2023/0131675 A1 | 4/2023 | Kunz | |
| 2023/0169746 A1* | 6/2023 | Dwivedi | G06F 18/214 |
| | | | 382/128 |
| 2023/0259575 A1* | 8/2023 | Hamedi | G06F 16/958 |
| | | | 709/219 |

* cited by examiner

METHOD AND AN APPARATUS FOR INLINE IMAGE SCAN ENRICHMENT

FIELD OF THE INVENTION

The present invention generally relates to the field of machine-learning. In particular, the present invention is directed to a method and an apparatus for inline enrichment of digital images during the scanning process.

BACKGROUND

Digitization of images continues to be a tedious, cumbersome excursion within many fields, but especially in the medicine community. Stringent requirements for patient confidentiality obligate many healthcare providers to rely on archaic methods to individually scan an abundance of documents individually in order to have access to the information contained within them. The difficulty is aggregated further when the initial scan is later identified as insufficient for use because the scan was hastily executed and did not capture the targeted details.

SUMMARY OF THE DISCLOSURE

In an aspect an apparatus for inline scanned image enrichment is provided. The apparatus includes a computing device configured to receive a plurality of subject data, generate a candidate set to model the scan focal points from, digitally capture the slide using the identified focal points through machine-learning processes, processing the captured image to optimize its viewability, and storing the captured image in an accessible repository.

In another aspect, a method for inline scanned image enrichment is provided. The method includes receiving, by a computing device, a plurality of subject data, generating, by the computing device, a candidate set to model the scan focal points off of, digitally capturing, by the computing device, the slide using the identified focal points through machine-learning processes, capturing, by the computing device, the specifically intended details, processing, by the computing device, the captured image to optimize its viewability, and storing, by the computing device, the captured image in an accessible repository.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to inline image optimization during the scanning process. In an embodiment, apparatus and methods may include utilizing machine-learning to identify focal points for documents or slides requiring scanning. Further, the optimization may then assess a confidence threshold for the scanned image and determine if alterations are needed to fully capture the specifically intended information within the document or slide. Aspects of the present disclosure can be used to digitally capture the focal points of slides or documents during the scanning process, thereby mitigating the necessity to repeat digital scans.

Figure 1:
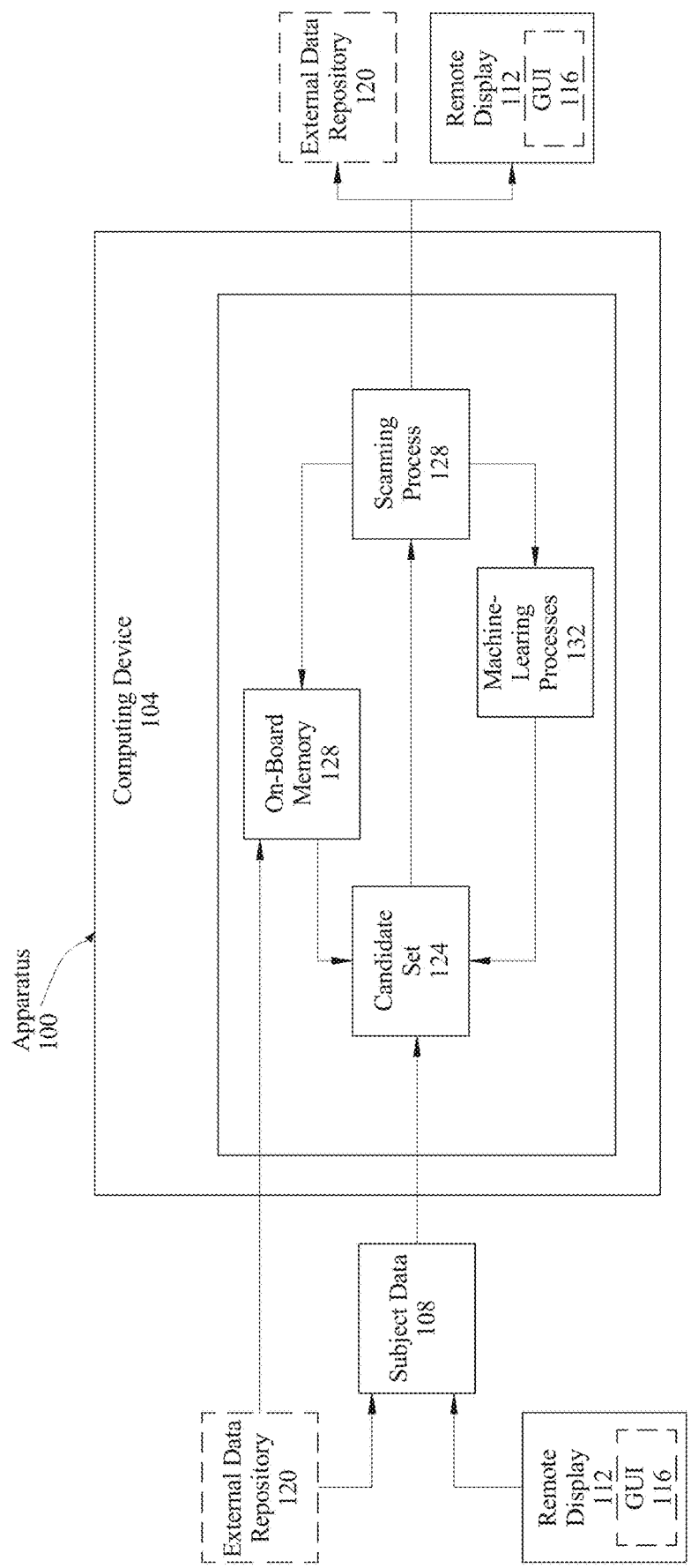
FIG. 1 is a block diagram of an exemplary embodiment of an apparatus for inline scanned image enrichment.

Referring now to FIG. 1, an exemplary embodiment of an apparatus 100 for inline scanned image enrichment is illustrated. Apparatus includes circuitry 104 configured as described in more detail below. Circuitry 104 may include a computing device. Computing device may include any computing device as described in this disclosure, including without limitation a microcontroller, microprocessor, digital signal processor (DSP) and/or system on a chip (SoC) as described in this disclosure. Computing device may be or include a configurable hardware circuit. Computing device may include, be included in, and/or communicate with a mobile device such as a mobile telephone or smartphone. Computing device may include a single computing device operating independently, or may include two or more apparatus operating in concert, in parallel, sequentially or the like; two or more apparatus s may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture. Circuitry 104 may alternatively or additionally include a Field Programmable Gate Array (FPGA), a hardware circuit with one or more memory elements that may contain biases, weights, coefficients, or other parameters, or the like.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive a set of subject data 108. As used in this disclosure, "subject data" is a set of information relating to a subject's medical history. As a non-limiting embodiment, subject data 108 may include, without limitation, any info supporting a diagnosis and treatment of a current or past ailment. Subject data 108 may further include any of the following personal information: age, height, weight, heart rate, current diagnosis, medical history, allergies, current condition, current symptoms, known disorders, test results (e.g., basic metabolic panel, blood test, other physiological data, and the like), medications, growth chart, family history, medical treatment, and the like. Medical treatment may include medical evaluation, medical diagnosis, prescribing medicines/treatments, providing treatments, therapy, occupational therapy, physical therapy, care given during a hospital stay, surgery, treatment provided by a medical practitioner, and the like. Subject data 108 may include information about a current condition such as a reported stomach pain of the patient or other medical history data. As used in the current disclosure, "medical history" is any data relating to the user's medical care. Medical care may include any part of the attempt to improve the user's health. Subject data 108 may include past and present injuries or ailments suffered by the patient. Subject data 108 may further include subject metadata including, name, contact information, biometric data, location, and prior classifications whether based on symptoms, diagnoses, treatments, or any other data type but is in any way relevant for effectively capturing the targeted information.

With continued reference to FIG. 1, subject data 108 may be manually entered using a remote display 112. Remote display may incorporate a graphical user interface 116 configured by circuitry 104. For example, and without limitation, the user or a third party may manually input subject data 108 using graphical user interface 116 of circuitry 104 and/or a remote display 112, such as, for example, a smartphone or laptop. A "graphical user interface (GUI)," as used herein, is a graphical form of user interface that allows users to interact with electronic devices. In some embodiments, GUI 116 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like. In a non-limiting embodiment, remote display 112 may refer to multiple displays used collaterally to ingest, export, or share data across multiple platforms, as in a neural network described in detail below and in FIGS. 4-5.

Still referring to FIG. 1, in some embodiments, subject data 108 may include handwritten, pixelated, or poorly printed documents previously scanned in but not machine-readable. These types of subject data 108 may rely on optical character recognition or optical character reader (OCR), executed by circuitry 104 to automatically convert images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2 below. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 4-5 below.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, subject data 108 may additionally be generated via the answer to a series of questions. The series of questions may be implemented using a chatbot, as described herein below in reference to FIG. 3. A chatbot may be configured to generate questions regarding the user's current ailments, past ailments, medical history, family medical history, and the like. In a non-limiting embodiment, a user may be prompted to input specific information or may fill out a questionnaire. In an embodiment, GUI 116 may display a series of questions to prompt a user for information pertaining to subject data 108. As a further example, chatbot may display a list of possible conditions to user, from which user may select each applicable condition the user currently suffers from. In a non-limiting embodiment, circuitry 104 may receive user selection of an autoimmune disorder and select additional autoimmune disorders as a function of the user selection. In another example, and without limitation, a medical professional may input subject data 108 using GUI 116 and/or remote display 112. In another example, and without limitation, a third party, such as a different medical entity or healthcare provider, may transmit information of subject data 108 to circuitry 104. Subject data 108 may be transmitted to circuitry 104, such as via a wired or wireless communication, as previously discussed in this disclosure. Subject data 108 may be retrieved from multiple sources including clinical reports, available medical facility records, or insurance databases to aid in the rendered medical service. Further explanation of chatbot operations is described herein below and referenced in FIG. 3 below.

Still referring to FIG. 1, subject data 108 may be received from an external data repository 120. As used herein, "external data repository" is any accessible database containing information applicable to the specified subject and subject's medical history, but is not accessible within computing device's 104 internal network. External data repository may include hospital databases, insurance provider databases, emergency care databases, private practices, webcrawler searches, social media, or any other accessible medical information. If external data repository is a shared resource and available for uploads, completed scans from circuitry 104 may be saved to external data repository 120. In a non-limiting embodiment, where subject's birthday is not initially provided and not available within public records, circuitry 104 may search social media posts related to subject to identify a best estimate of birth year and day. Circuitry 104 may further assess a reliability score for each individual piece of subject data not directly provided by patient or user. In the case of the example above, where circuitry 104 discovers a "Happy 30$^{th}$ birthday!" post from Apr. 21, 2016, circuitry 104 may assume subject was 30 years old on the specified date and calculate a current age to autofill within subject data 108. That age may then be assigned a low reliability score and flagged for update or validation at a later time.

Still referring to FIG. 1, computing device receives subject data 108 and uses it to reference the most applicable candidate set 124 or build a new candidate set 124. As used herein, "candidate set" is a plurality of models to inform the scanning process 128 as well as detect features specific to the subject condition as derived from subject information. Candidate set 124 may be determined or built by machine-learning processes. Once a best fit candidate set 124 is declared by circuitry 104, it is used to program scanning process 128 characteristics to target the specific details sought based on the candidate set 124 model. The declared candidate set 124, which may be locally cached within circuitry 104 and/or memory communicatively connected to circuitry 104, such as memory electronically coupled to and/or combined in an electronic device with circuitry 104, may then be either instantiated directly on the configured circuitry making up circuitry 104, or stored in memory of or at the circuit from which it can be locally retrieved and instantiated. In a non-limiting embodiment, this instantiation of candidate set 124 may use flash memory which retains the parameter sets for candidate models. In a separate non-limiting embodiment, circuitry 104 may communicatively coordinate with external devices where candidate set 124 is stored to send the information within subject data 108 and any descriptors applied by circuitry 104 to retrieve the appropriate candidate set for local use. In a non-limiting embodiment, a broken tibia candidate set would focus scanning process 128 on x-ray scans with enhanced focus on fractures when x-ray document is labeled with patient's name and may be labeled as tibia or related anatomical reference. This enhanced focus may adjust illumination, angles, focus, resolution, magnification, or other scan characteristics to narrowly target the fracture indications. Candidate set 124 may be retrieved from an on-board memory 128. On-board memory 128 refers to any local repository where candidate sets 124 may be saved and recalled without any external network access. Candidate set 124 may further be retrieved from external data repository 120, defined and described above. Candidate set 124 may be built by circuitry 104 when no available candidate set to sufficiently match subject data 108 is available. In a non-limiting embodiment, in cases where no candidate set fits, circuitry 104 may prompt user to specify the type(s) of data, location, key words, physical attributes, or other descriptive characteristic to focus the scanning process. When this type of additional manual input is necessary, circuitry 104 may prompt user for additional feedback upon concluding scan. If user feedback affirms the results, circuitry 104 may commit the newly generated candidate set to either on-board memory 128, or an available external data repository 120 for future use.

Still referring to FIG. 1, scanning process 128 conducts a scan of a plurality of documents or slides as assigned by user. Scanning process 128 may be carried out by any equipment capable of converting tangible documents or images into digital documents or images. In a non-limiting embodiment, scanning process 128 may be conducted by desktop scanners often referred to as flatbed scanners, sheet-fed scanners wherein multiple documents may be preloaded, drum scanners for negatives or transparent film, portable scanners including handheld devices able to convert a photo to a digital scan, or any other type of scanning device. Candidate set 124 programs both software and hardware adjustments to optimize the scan outputs from scanning process 128. Scanning process 128 may then execute multiple scans with slight variations in each such that a stack of scans may later be correlated within a continuum diffusion model. As used herein, a "continuum diffusion model" is a software and hardware package capable of aligning and aggregating multiple images such that they form a single polished, uninterrupted portrayal of the targeted subject data. Continuum diffusion model allows user to fully interrogate all of the captured information within a single viewing engagement rather than querying each individual image separately. Continuum diffusion model relies on software to detect similar features and the altered angle, magnification, focus, illumination, resolution or other scan characteristic adjustments made between each individual scan, such that model may compile, align, and correlate views in an aggregate form and maximize the advantages of each individual image. Each individual scan may be intentionally shifted by set amounts such that a downstream program may reassemble the stack of scans in a logical manner for ease of user viewing. This process may be accomplished purely in image analysis software, or it may rely on detecting the adjusted scan features and automatically diffuse the images together based on the scan source features. In a non-limiting embodiment, a stack of scans may enable user to toggle the viewing angle or depth by rotating the digital version, or zooming in and out as necessary through a tool capable of this type of model views. Scans, as used herein, may refer to a multitude of types of images to be digitally replicated. In a non-exhaustive, non-limiting embodiment, scans may include nuclear medicine scans, positron-emission tomography (PET) scans, Gallium-67 scans, results from photo-acoustic imagery, ultrasound technology, optical scanning techniques, Computerized Tomography (CT) scans, C-arm image-acquisitions, MRI scans, or any other medical imaging use. In a separate, non-limiting embodiment, continuum diffusion model may enable the correlation and synthesis of a hematoxylin and eosin (H&E) stained slide with an Estrogen Receptor, Progesterone Receptor (ER/PR) test slide. Candidate set 124 and scanning process 128 may enable this type of fusion of differing slides when they relate to the same sample or type of material. In a separate, non-limiting embodiment, scanning process 128 may correlate a tumor heterogeneity analysis across multiple slides by identifying correlated size, angle, color, quantity, lighting, depth, or other characteristics which suggest a sample is related to another sample.

Still referring to FIG. 1, scanning process 128 may use candidate set 124 to enrich the image inline with no additional obligatory user input. Scanning process 128 may rely on machine-learning processes to evaluate and enhance the scanned image. With sufficient training data, scanning process 128 may identify basic entities and specific arrangement of those basic entities, such as the specific nuclei types and order contained within the scan. Through the identified focus points delineated by candidate set 124, scanning process 128 may identify basic entities and their arrangement based on the concentration of nuclei, their arrangement relative to the other material in the scan, their size, shape, color, filaments or protrusions from the cell(s), dynamic changes or movements of the cell(s), or other recognizable visual characteristic(s). Examples of additional recognizable visual characteristics may include recognition of the physical characteristics of non-cell properties, such as surrounding blood vessel sizes, points of integration or other relational properties between the cell(s) and other matter, or the focal point material's relative size, color, or shape as compared to other material within the scan. Scanning process 128 may further identify the architecture of the basic entities. In a non-limiting embodiment, basic entity architecture may be indicative of a specific type of tissue or material (e.g. breast biopsy, ducts, muscle, nerves, blood vessels, etc.). When multiple scans are conducted based on the same patient data 108, scanning process 128 may recognize changes in the architecture or arrangement of the scanned material such that it may affirm or diagnose a condition based on the recognized physical characteristics in both scans (e.g. abnormal nuclei contained within a breast biopsy being indicative of a ductal carcinoma or tumor). Scanning process 128 may also detect certain physical properties related to the scan. In a non-limiting embodiment, scanning process 128 may detect the actual size of a tumor area or necrosis. This data may then be appended to the scan output, or displayed within remote display 112 and/or GUI 116. Training data and machine-learning processes are described in detail in reference to FIG. 2 below.

Still referring to FIG. 1, scanning process 128 and candidate set 124 are managed by machine-learning processes 132. Machine-learning processes generally are described in detail below. Candidate set 124 is assigned based on subject data 108 and the details contained therein. Specifically, circuitry 104 may rely on a subject data classifier to interpret, classify, and group the details of subject data 108. In a non-limiting embodiment, subject data classifier may identify subject data 108 containing multiple symptoms usually indicative of a pulmonary infection and assign a descriptor summarizing that characteristic based on the grouping of all affiliated symptoms. Once verified as appropriate either by direct user feedback, or by successful scans of images targeting the correct focal points as identified by a candidate set 124 that is based on pulmonary infections, machine learning processes 132 may then rely on this descriptor use for future analyses. With specific reference to machine-learning processes 132, circuitry 104 may rely on training data to improve candidate set 124 assignment and scanning process 128 focus and targeting processes. Training data improving these processes may be in the form of user feedback, or simulated scenarios wherein a set of simulated subject data is provided to circuitry 104 and purposefully matched with a candidate set 124 such that user may then provide feedback to either promote or suppress the match. In a non-limiting embodiment, user may compile subject data 108 with symptoms obviously indicative of a brain tumor, but based on insufficient availability of candidate set 124 to match the symptoms, circuitry 104 recommends a candidate set 124 for migraines. User may, through GUI 116, suppress the match by correcting the proper candidate set 124 to a more closely representative candidate set 124 or by assembling a new model candidate set 124 for brain tumors which may be used in the future for sets of subject data 108 similarly describing a brain tumor. Machine-learning processes 132 may conduct confidence checks of completed scans to ensure targeted data as identified by candidate set 124 is sufficiently captured. Training data may further rely on user feedback to approve or disapprove of completed scans to train the confidence threshold applied.

Still referring to FIG. 1, scanning process 128 may take additional steps beyond simply capturing a scan. Scanning process 128 may also quantify the size and number of target matter, as in estimating the size of an identified tumor. Scanning process 128, based on candidate set 124, may identify certain conditions based on the physical properties (e.g. observed colors following an H&E stain). As a separate example, after multiple runs of scanning process 128, completed scan may still be inadequately capturing the targeted details, wherein machine-learning processes 132 may identify, based on a confidence threshold assessment, the inadequacy. Machine-learning processes 132 may then direct the scan to be reconducted, or conclude the document or slide is incompatible for data retrieval, wherein remote display 112 and/or GUI 116 would generate this feedback for user. This process of validating sufficient scan quality may depend on blur detection methods described in detail below in reference to FIG. 2. In a non-limiting embodiment, confidence threshold may be strictly a user generated standard based on a plurality of instance of user feedback assessing a completed scan for satisfactory quality. Machine learning processes 132 may rely on user feedback as training data to generate a lower threshold for scan quality, wherein any scan falling below the learned confidence threshold would immediately be re-captured to improve the quality. When insufficient details are contained within subject data 108 to readily identify a fitting candidate set 124, circuitry 104 may initiate a chatbot communication, sourced either from circuitry 104 or externally from an affiliated remote device in communication with circuitry 104, with user to clarify the missing information. Chatbot engagement may rely on a decision tree or database to successfully guide the communication to acquiring the missing information. Chatbot interaction and decision tree or database use are discussed in detail below in reference to FIG. 3.

Still referring to FIG. 1, scanning process 128 may incorporate image processing algorithms to enhance the quality of the scanned product to enhance at least a viewability characteristic. These algorithms may enable resolution enhancements, light and shading adjustments, color optimization, smoothing, sharpening, or any other variation of image improvement. This processing step may be conducted prior to a confidence threshold assessment to improve the likelihood that the specifically intended data capture was sufficiently gathered. Image processing may also be completed subsequent to a satisfactory confidence threshold assessment, such that an image deemed good enough will still be improved prior to user viewing or storage. Scanning process 128 may append certain pathology-related information deemed relevant and applicable to the completed scan. In a non-limiting embodiment, this type of appended information or user query may enable the user to direct apparatus 100 to assess a tumor infiltrating lymphocyte within a tumor-associated stroma. Apparatus 100, relying on machine-learning processes 132, may identify and label the specific physical characteristics within the scanned slide supporting the assessment of the tumor infiltrating lymphocyte. Additionally, user may be prompted with the option for further processing and may choose from a list of specific types of processing as presented through GUI 116. Once a completed scan concludes any image processing operations, it is stored in an external data repository 120, displayed using remote display 112, or both. Additionally, each individual stack view may be saved either locally to circuitry 104, to external data repository 120, or both, such that they may be recalled upon user command or used as training data. Training data is discussed in detail below in reference to FIG. 2.

Figure 2:
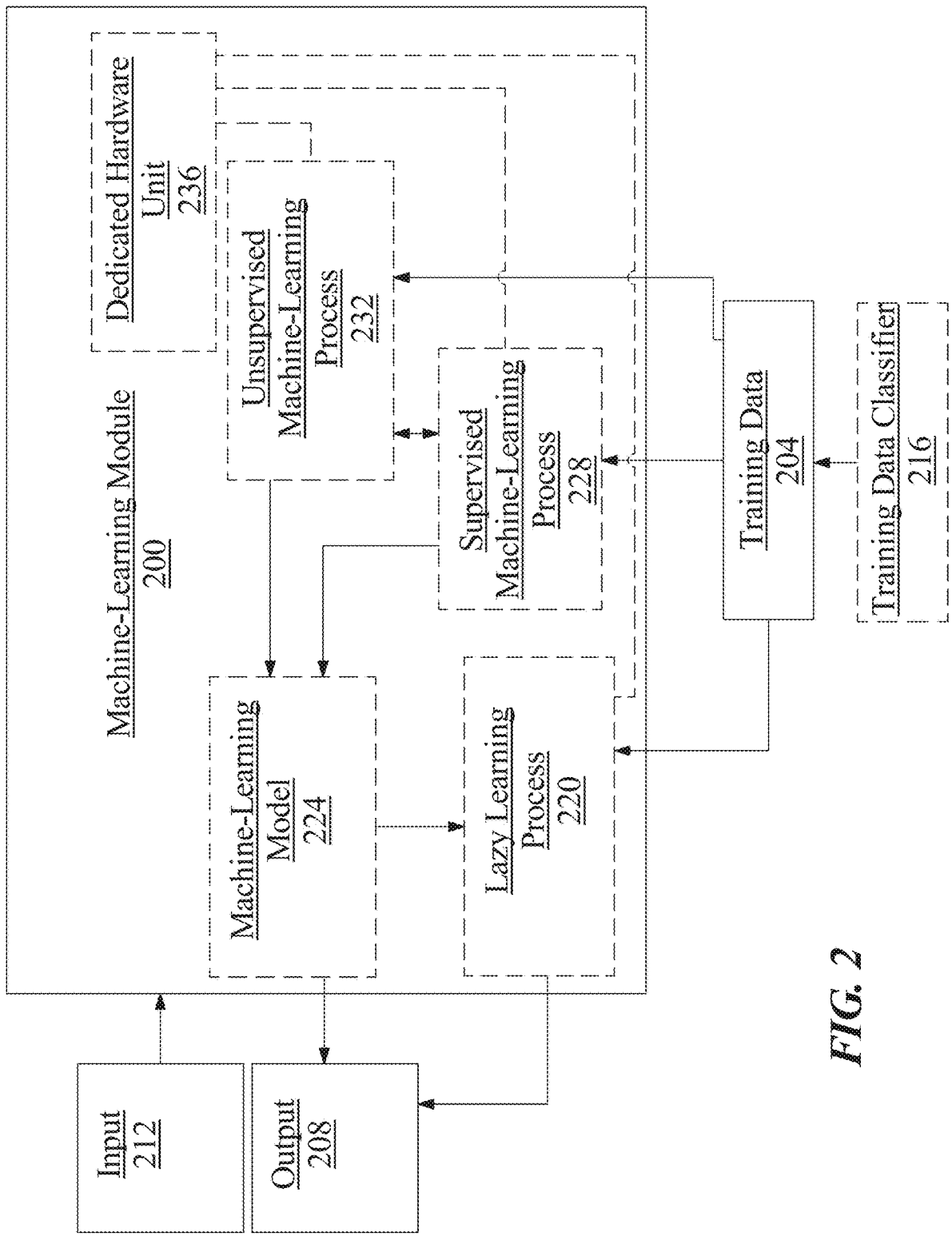
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of verified input to output correlations or rejections. In a non-limiting example, training data 204 may include direct user feedback indicating a completed scan is adequate and captured the correct information, wherein machine-learning process would then reference that specific subject data to completed scan correlation as a correct implementation and adapt future scans to more closely replicate that specific implementation. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a compilation of candidate set models may each be initially affiliated with certain descriptors aimed at summarizing subject data. As a non-limiting example, patient blood pressure records consistently exceeding medical guidelines (e.g. systolic pressure of 150 mmHg with diastolic pressure of 90 mmHg as compared to guidelines of 120/80) would be tagged with a "high blood pressure" descriptor. This high blood pressure descriptor may alone be sufficient to match subject data to a high blood pressure candidate set. But it also may be used alongside several other descriptors to assign a candidate set model for angina, a condition of acute chest pain caused by reduced blood flow to the heart. Training data may be in the form of user feedback through a GUI to support these types of descriptor affiliations with candidate sets, or to deny them if the logic is not aligned to accurate, current medical reasoning. Training data may also be in the form of a mass import of candidate sets already affiliated with certain descriptors, and may further already contain confidence thresholds assessments based on how likely certain descriptors are to be affiliated with certain candidate sets.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as K-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a confidence threshold, wherein training data 204 may assess a scan as sufficient quality and assign it a mid to high confidence threshold. User may subsequently review scan and provide feedback that the scan is not usable based on a low quality, which would be used as training data 204 and apply it to future scans such that the confidence threshold may be raised to compensate for the prior over-estimated confidence assessment. Additionally, in a separate example as described above, training data may be provided by an absence of feedback. While machine-learning module 200 may give less weight to an absence of feedback than affirmative user feedback, that absence of feedback will indicate an acceptable scan output in most cases. Therefore training data 204 may rely on an absence of feedback to promote the subject data to candidate set affiliation used in support of the scan.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as time series data, images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more detected blurs. Detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures blurriness based on the gradient or first derivative of an image, based on the hypothesis that rapid changes indicate sharp edges in the image, and thus are indicative of a lower degree of blurriness. Blur detection may be performed using a Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a KNN algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs, as described as inputs herein (subject data including symptoms, medical history, identifying information and affiliated descriptors), outputs (completed scan of document or slide), as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a confidence threshold representing the likelihood the specifically intended data as identified by the candidate set model was properly captured in the completed scan, where confidence is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithms may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes described below in reference to FIGS. 4-5.

Continuing to refer to FIG. 2, machine-learning model 224 may be configured using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor may then calculate a likelihood table by calculating probabilities of different data entries and classification labels. Processor may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 2, machine-learning model 224 may be configured using a KNN algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value determining the most common classifier of the entries in the database and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating KNN algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/ or modules such as without limitation ASICs, production and/or configuration of reconfigurable hardware elements, circuits, and/or modules such as, without limitation, Field Programmable Gate Arrays (FPGAs), production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
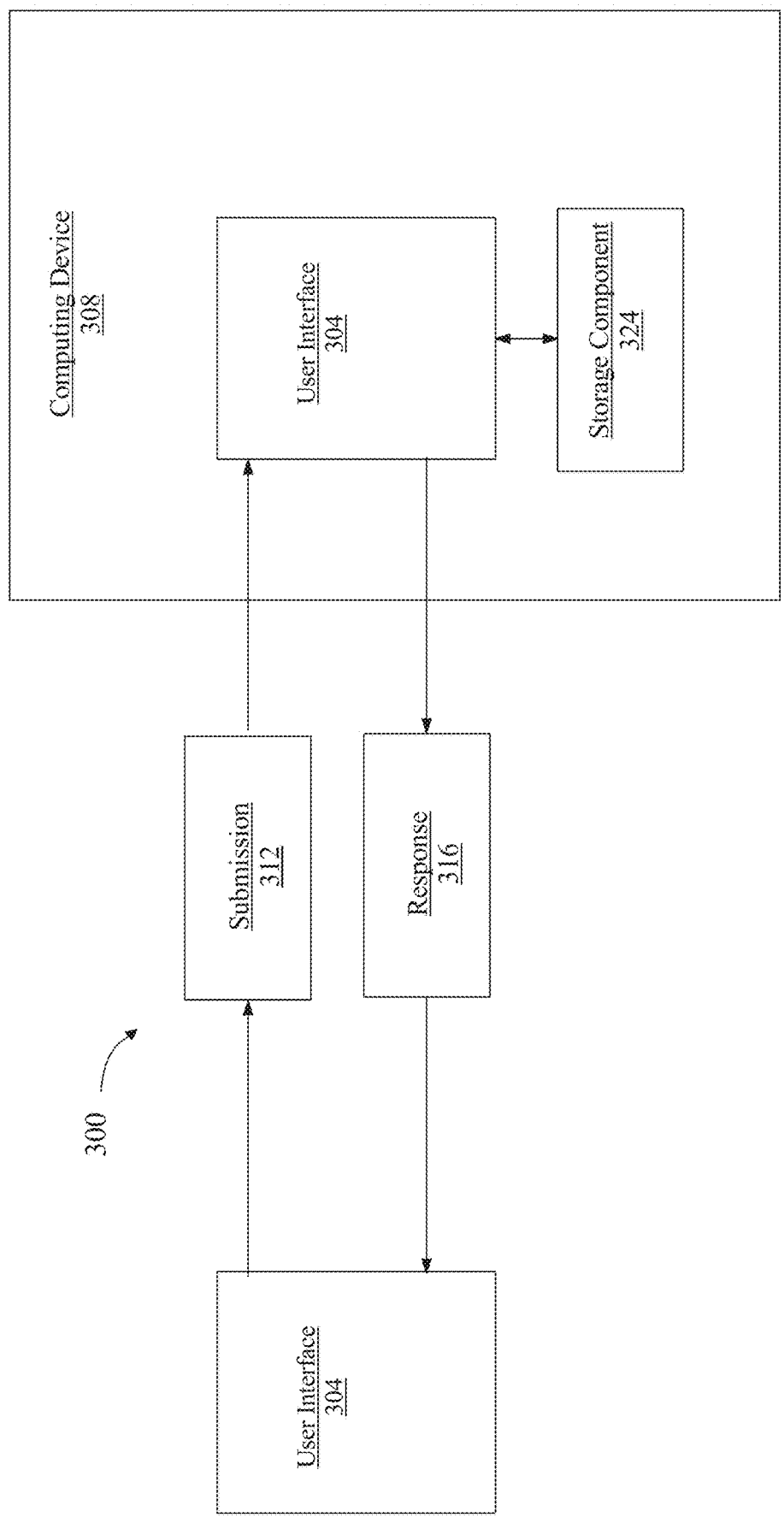
FIG. 3 is a block diagram of an exemplary chatbot process.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device 304 may be used by computing device 308 as an input to another function.

With continued reference to FIG. 3, chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. Chatbot may then use a decision tree, data base, or other data structure to respond to the user's entry into the chatbot as a function of a chatbot input. As used in the current disclosure, "Chatbot input" is any response that an entity or user inputs into a chatbot as a response to a prompt or question.

With continuing reference to FIG. 3, computing device 308 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally, subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an API. Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision. In a non-limiting embodiment, based on a limited set of subject data provided for input, decision tree may generate a plurality of follow-up questions, each based on the aggregated sum of data available from all inputs. Specifically, a subject data set containing only a high blood pressure reading may generate a branch of questions focused on a variety of potential heart problems, wherein a positive assertion to a question about chest pain may further trigger questions to initially eliminate potential causes, then eventually narrow in to explicitly isolate the condition to a defined candidate set. Continuing with the high blood pressure example, a follow up question may query about chest pain, wherein a negative response would potentially trigger a query of a familial history of high blood pressure. These decision tree questions may be used to bridge the gap of subject data symptoms to available candidate sets. So immediately once chatbot 300 is able to isolate subject data to an available candidate set, questioning would conclude. User feedback to affirm or reject the identified candidate set would be used as training data for future chatbot interrogations and candidate set affiliations as described above.

Figure 4:
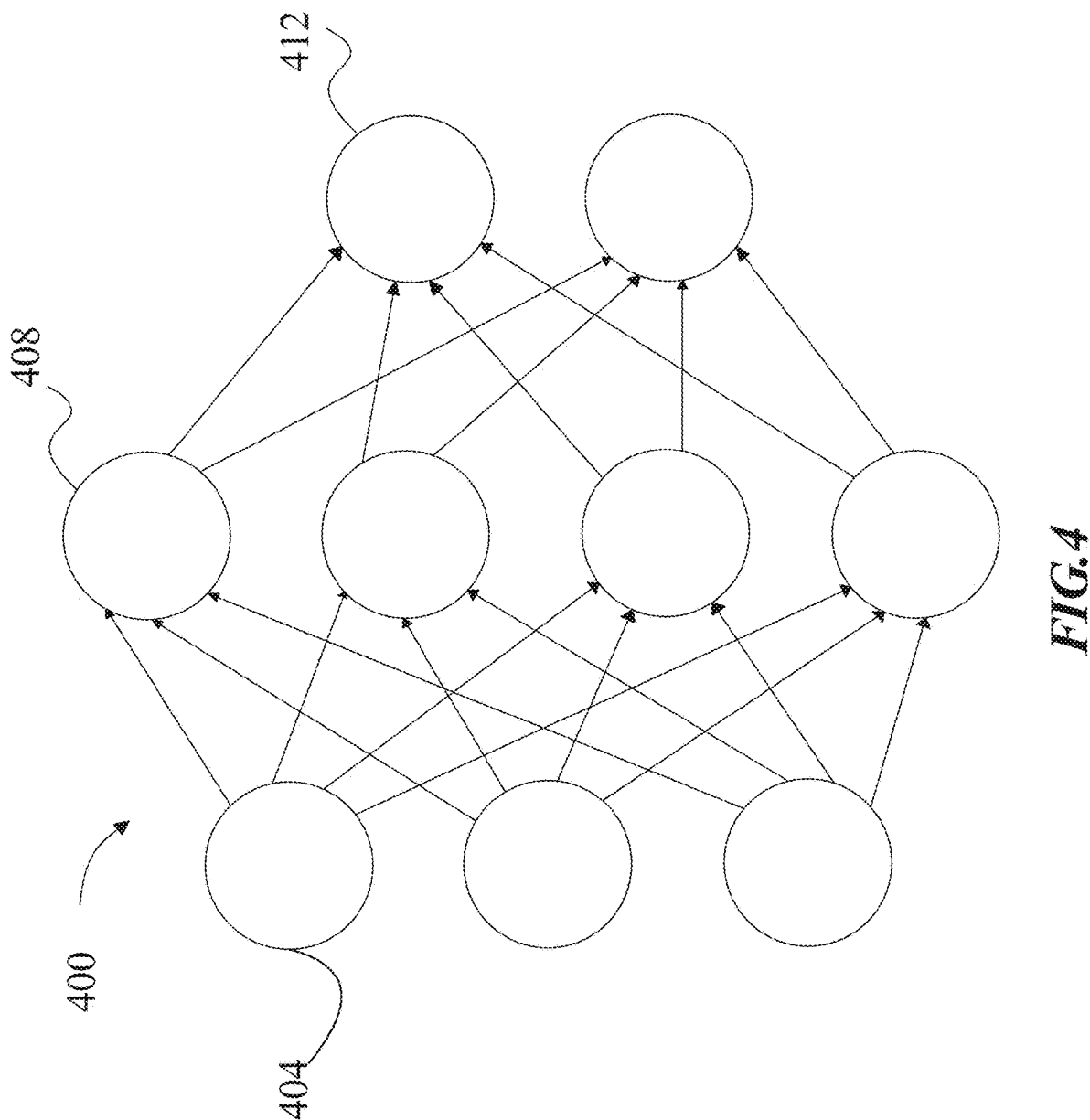
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. In a non-limiting embodiment, input layer of nodes 404 may include any remote display where user inputs may be provided from, while output layer of nodes 412 may include either the local device if it has the processing capability to support the requisite machine-learning processes, or output layer of nodes 412 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
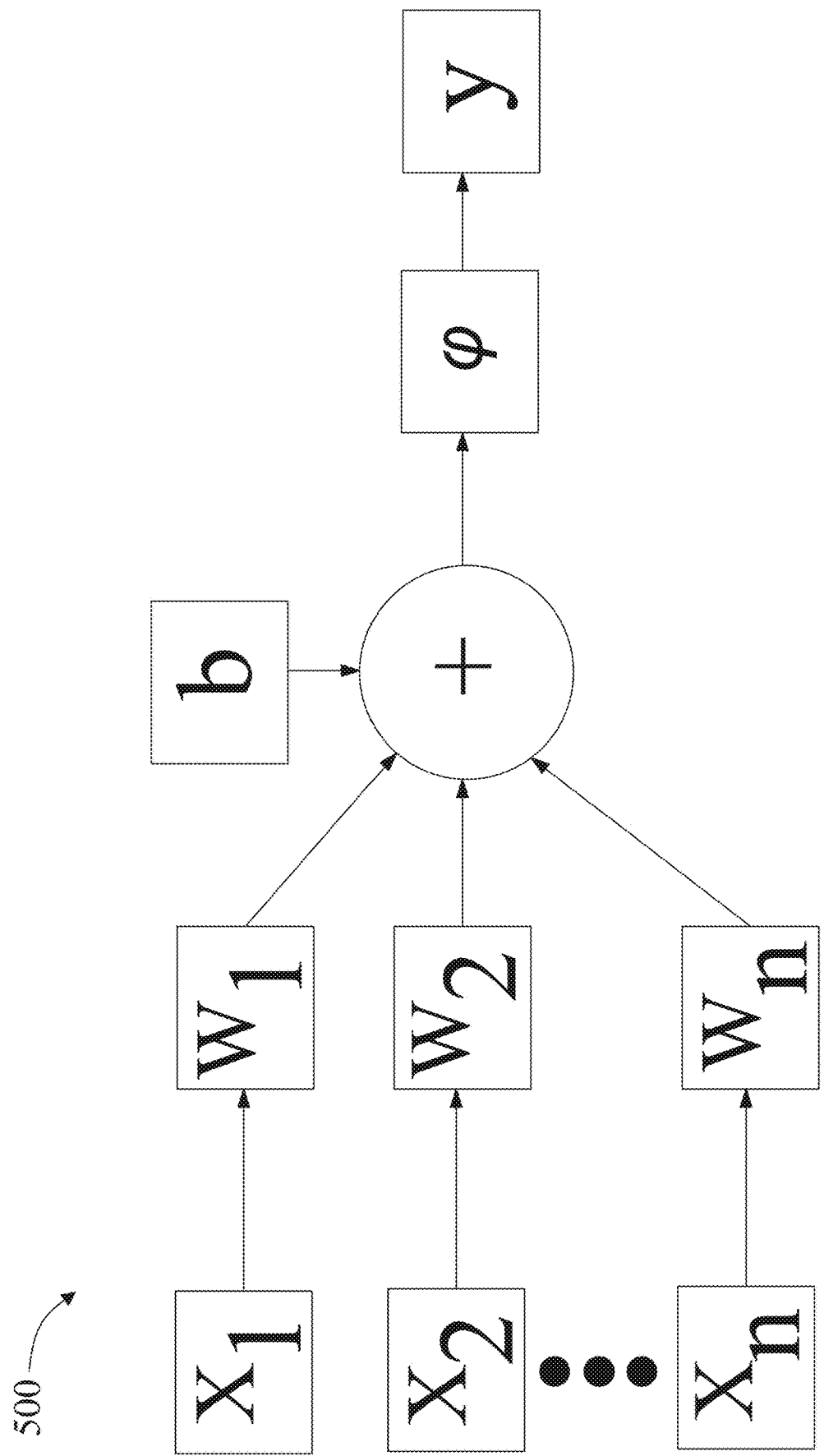
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
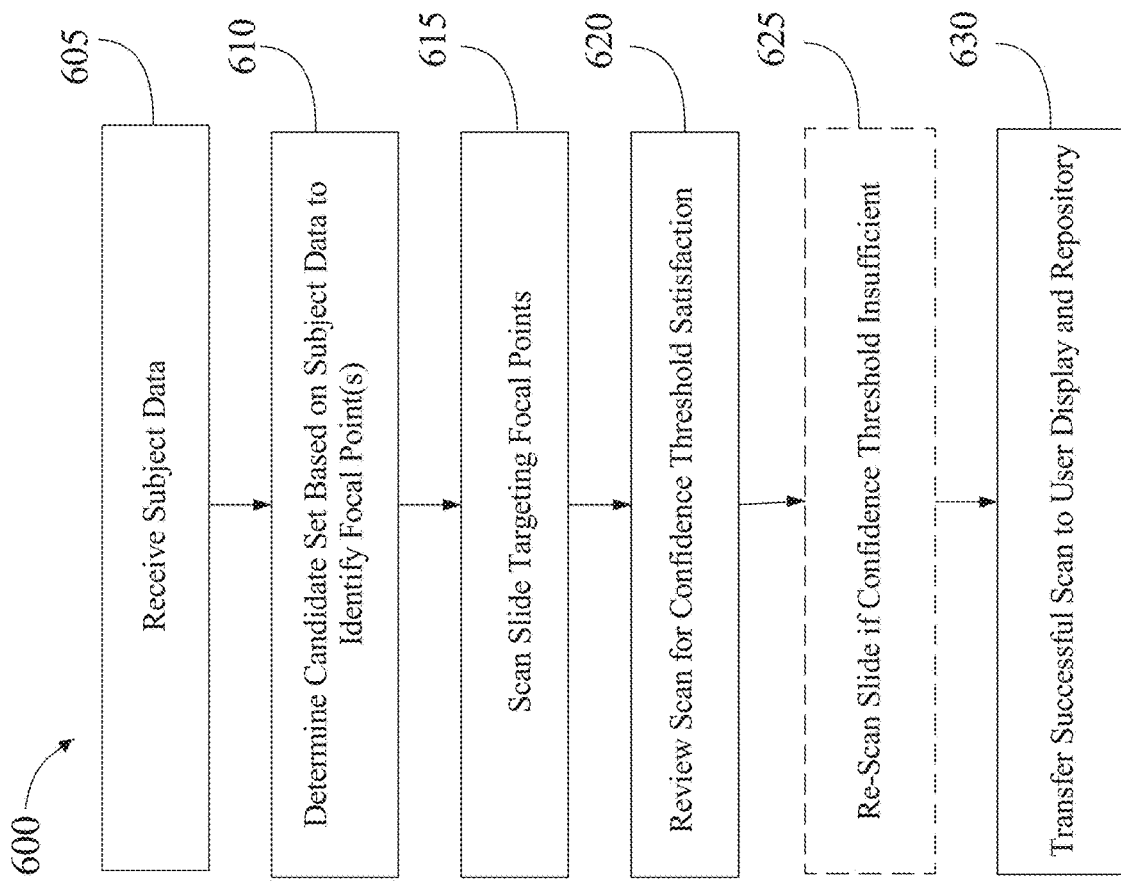
FIG. 6 is a flow diagram of an exemplary method for inline scanned image enrichment.

Referring now to FIG. 6, a flow diagram of an exemplary method 600 for inline enrichment of digital images during the scanning process is illustrated. At step 605, method 600 includes receiving, using at least a computing device, subject data relating to a set of medical information supporting the targeting of specific details within a scanned document or slide. This may be implemented as described and with reference to FIGS. 1-7. In some embodiments, subject data may be received from an API, remote database, and/or a web crawler.

Still referring to FIG. 6, at step 610, method 600 includes determining, using at least a computing device, a candidate set based on subject data, wherein identified candidate set is used to standardize the targeting of specific types and locations of information. This may be implemented as described and with reference to FIGS. 1-7.

Still referring to FIG. 6, at step 615, method 600 includes scanning, using at least a computing device, a document or slide, wherein scanning targets the optimization of specific information as identified by the affiliated candidate set. This may be implemented as described and with reference to FIGS. 1-7.

Still referring to FIG. 6, at step 620, method 600 includes reviewing, using at least a computing device, the scanned image for satisfaction of a confidence threshold, wherein the confidence threshold is used to assess the likelihood the scan effectively capturing the specifically intended information. Where the confidence threshold is insufficiently low, as assessed by machine-learning processes, the scan may be reconducted or an incomplete scan notification may be displayed for the user to direct the next step. This may be implemented as described and with reference to FIGS. 1-7.

Still referring to FIG. 6, at step 625, method 600 includes re-scanning, using at least a computing device, the document or slide when the assessed confidence threshold is insufficiently low. Wherein the initial scan is assessed as having a satisfactory confidence threshold, this step may not be necessary. This may be implemented as described and with reference to FIGS. 1-7.

Still referring to FIG. 6, at step 630, method 600 includes transferring, by at least a computing device, the successful scan to a user display and an appropriate storage repository. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
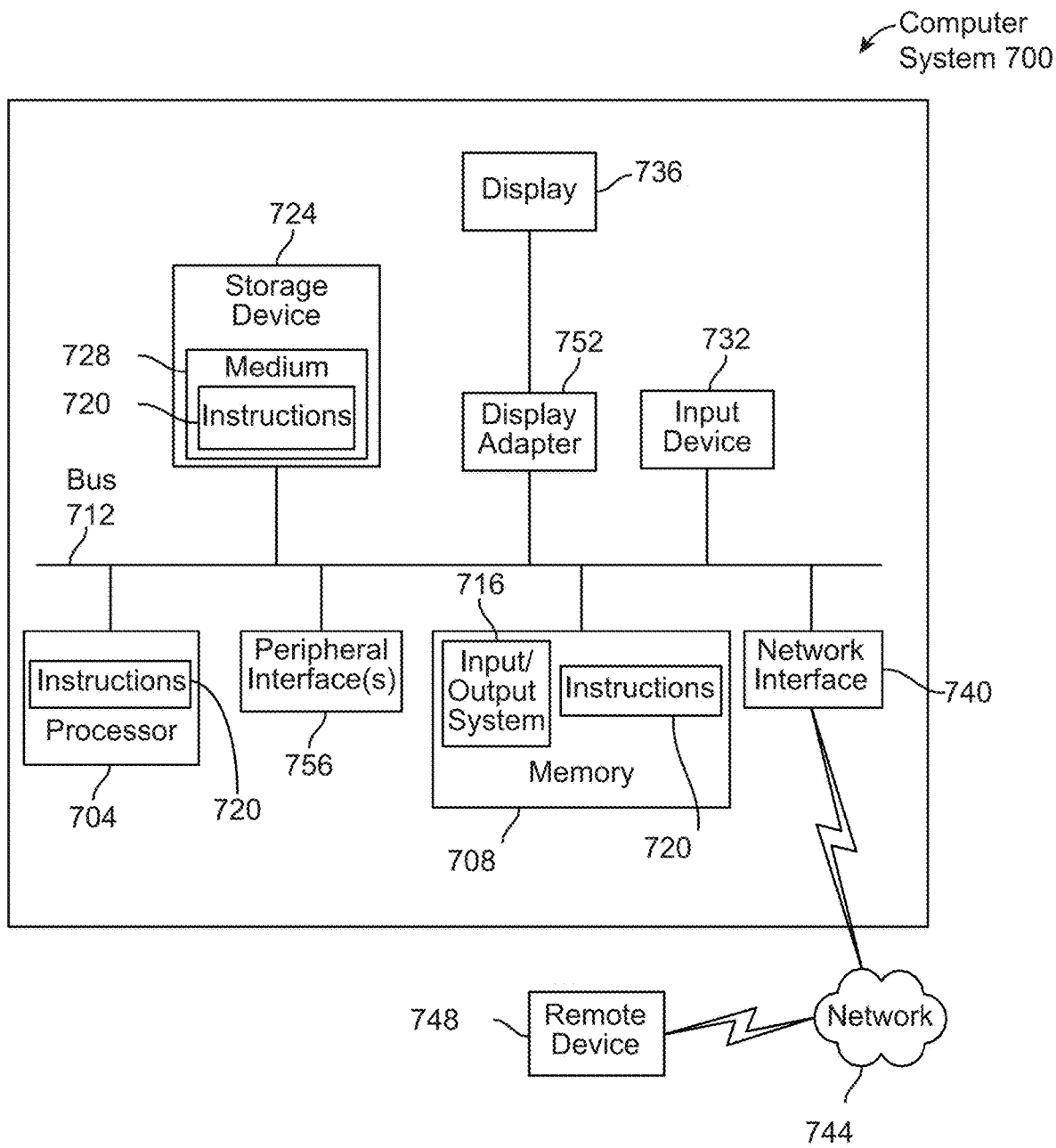
FIG. 7 is a block diagram of a computer device that can be used to implement any one or more of the methodologies disclosed herein and any one or more portions thereof.

Referring now to FIG. 7, a diagrammatic representation of one embodiment of a computing device in the exemplary form of a computer system 700 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

The invention claimed is:

1. An apparatus for inline image enrichment, wherein the apparatus comprises:
    circuitry configured to:
        receive a plurality of subject data corresponding to a subject;
        generate a model candidate set using the plurality of subject data;
        instantiate at least a model of the model candidate set;
        digitally capture an image of the subject, wherein digitally capturing the image comprises:
            identifying at least a focal point using the at least a model; and
            capturing the image as a function of the at least a focal point;

capturing a plurality of individual stack views of the image comprising a stack of scans which enable a user to toggle the viewing depth by rotating a digital version of the stack of scans;
saving each individual stack view; and
executing a continuum diffusion process to fuse individual stack views together; and
store the captured image in a repository.

2. The apparatus of claim 1, wherein the circuitry includes a configurable hardware circuit.

3. The apparatus of claim 1, wherein generating the model candidate set further comprises classifying the plurality of subject data to at least a candidate model of a plurality of potential candidate models.

4. The apparatus of claim 1, wherein:
the plurality of subject data includes at least an element of subject metadata; and
generating the model candidate set further comprises generating the model candidate set using the subject metadata.

5. The apparatus of claim 1, wherein instantiating the at least a model further comprises instantiating a locally cached model.

6. The apparatus of claim 1, wherein instantiating the at least a model further comprises:
receiving a remotely cached model; and
instantiating the remotely cached model.

7. The apparatus of claim 1, wherein capturing the image further comprises:
reviewing an initial scan;
comparing the initial scan to a confidence threshold; and
performing a subsequent scan based on the comparison.

8. The apparatus of claim 1, wherein the plurality of individual stack views correspond to a plurality of distinct focal points.

9. The apparatus of claim 1 further configured to enhance at least a viewability characteristic of the image using a machine-learning process.

10. A method for inline image enrichment, wherein the method comprises:
receiving, by a configured circuitry, a plurality of subject data corresponding to a subject;
generating, by the configured circuitry, a model candidate set using the plurality of subject data;
instantiating, by the configured circuitry, at least a model of the model candidate set;
digitally capturing, by the configured circuitry, an image of the subject, wherein digitally capturing the image comprises;
identifying, by the configured circuitry, at least a focal point using the at least a model;
capturing, by the configured circuitry, the image as a function of the at least a focal point;
capturing a plurality of individual stack views of the image comprising a stack of scan which enable a user to toggle the viewing depth by rotating a digital version of the stack of scan;
saving each individual stack view; and
executing a continuum diffusion process to fuse individual stack views together; and
storing, by the configured circuitry, the captured image in a repository.

11. The method of claim 10, wherein the configured circuitry includes a configurable hardware circuit.

12. The method of claim 10, wherein generating the model candidate set further comprises classifying, by the configured circuitry, the plurality of subject data to at least a candidate model of a plurality of potential candidate models.

13. The method of claim 10, wherein:
the plurality of subject data includes at least an element of subject metadata; and
generating the model candidate set further comprises generating, by the configured circuitry, the model candidate set using the subject metadata.

14. The method of claim 10, wherein instantiating the at least a model further comprises instantiating, by the configured circuitry, a locally cached model.

15. The method of claim 10, wherein instantiating the at least a model further comprises:
receiving, by the configured circuitry, a remotely cached model; and
instantiating the remotely cached model.

16. The method of claim 10, wherein capturing the image further comprises:
reviewing, by the configured circuitry, an initial scan;
comparing, by the configured circuitry, the initial scan to a confidence threshold; and
performing a subsequent scan based on the comparison.

17. The method of claim 10, wherein the plurality of individual stack views correspond to a plurality of distinct focal points.

18. The method of claim 10 further comprising enhancing, by the configured circuitry, at least a viewability characteristic of the image using a machine-learning process.

* * * * *